Patented Feb. 27, 1945

2,370,561

UNITED STATES PATENT OFFICE 2,370,561

THERAPEUTIC PRODUCT AND METHOD OF MAKING SAME

Sebastian B. Mecca, Philadelphia, Pa., assignor to Schuylkill Chemical Company, Philadelphia, Pa., a corporation of Delaware No Drawing. Application July 11, 1941,
Serial No. 402,007

11 Claims. (Cl. 167—63)

The present invention relates to a novel therapeutic product possessing many advantageous properties, and to the method of preparing the same, and more particularly it relates to a composition comprising the active molecular structure both of allantoin and of a sulfa-compound of the type of sulfanilamide, sulfapyridine, sulfathiazole, and sulfaguanidine.

The named sulfa-compounds are now used extensively and effectively in the treatment of streptococci, pneumococci, staphylococci, micrococci, and related infections. The chemical, however, is relatively toxic and in many cases tends to produce leucopenia and agranulocytosis, and to destroy the red cells or corpuscles in the blood stream of the patient. These resultant developments may lead to serious consequences and hence the chemicals are used only under expert medical guidance.

Allantoin, on the other hand, has been and is used successfully as a cell proliferant. This substance has the disadvantage of not being a germicide, but it possesses the ability of producing and increasing the number of white cells in the blood stream within a very short time after administration. Hence, it is used to advantage in creating and promoting resistance and immunity to disease.

Contrary to what was expected, it has been found that a therapeutic preparation comprising the active molecular structure both of allantoin and of the sulfa-compound of the type mentioned possesses properties not to be expected from the known properties of the individual compounds. For example, not only is the product of the present invention substantially more effective than is the sulfa-compound when used alone, but the occurrence of leucopenia and agranulocytosis and the destruction of red blood cells, heretofore encountered in the use of the sulfa-compound, are indicated by tests to be substantially eliminated. Furthermore, by the use of the compound of the present invention, substantially larger quantities of the sulfa-compound may be administered than heretofore possible without producing any toxic effects, thereby substantially increasing and accelerating the effectiveness of the treatment.

The principal object of the present invention is, therefore, to provide a therapeutic product possessing advantageous properties including those hereinabove set forth.

A further object is to provide a novel ointment or salve which contains the therapeutic product referred to, and which, therefore, is available for use in the treatment of open wounds ulcers, and the like.

Other objects, including a novel method of preparing the therapeutic product, will be apparent from a consideration of the specification and claims.

Referring to the sulfa-compounds, sulfanilamide, known chemically as para-aminobenzene-sulfanamide, and the structure thereof is represented by the formula:

Sulfapyridine, sulfathiazole, and sulfaguanidine are represented respectively by the formulae:

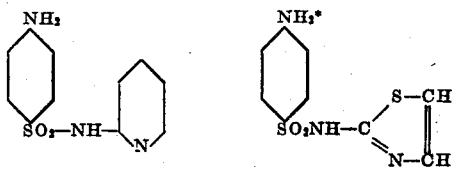

and

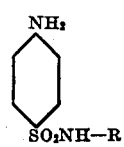

It will, therefore, be seen that the various sulfa-compounds may be represented generically by the formula

where —R is a substituent selected from the group consisting of —H (sulfanilamide);

(sulfapyridine);

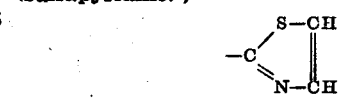

(sulfathiazole); and

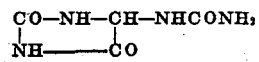

(sulfaguanidine).

Allantoin is known chemically as glyoxyl diureid or 4-carbamidohydantoin and is represented by the structural formula:

$$CO-NH-CH-NHCONH_2$$
$$NH\underline{\quad\quad}CO$$

or by the empirical formula: $C_4H_6N_4O_3$.

While, as will hereinafter appear, the therapeutic product may if desired comprise an intimate mixture of the sulfa-compound and allantoin, a more efficacious product, both from the standpoint of rapidity of action and amount required, results if the therapeutic product comprises a chemical entity in which there is present the active molecular structure both of the allantoin and of the sulfa-compound. Hereinafter in this specification and in the claims where the term, a therapeutic product comprising the active molecular structure of the two compounds, is employed, it is to be understood as including both the intimate mixture and the chemical entity. The chemical entity will be designated by such term, or as a reaction product between the allantoin and the sulfa-compound, or by the chemical formula.

Referring to the chemical entity, this is advantageously prepared by reacting, in equimolecular proportions, a salt of the sulfa-compound formed, for example, by treating the sulfa-compound with an acid, with a salt of allantoin formed, for example, by treating allantoin with a base. To convert the sulfa-compound into its salt, it may be dissolved in any acid capable of forming a soluble salt, and the use of hydrochloric acid is preferred but any other acid, inorganic or organic, capable of forming a soluble salt, such as sulfuric, nitric and phosphoric, may be employed. The allantoin may be dissolved in any base capable of forming a soluble salt thereof, for example, caustic soda or potash or ammonium hydroxide. The reaction product may be obtained by dissolving the appropriate salts in a solvent, such as water, or the sulfa-compound may be dissolved in a suitable amount of an acid solution and the allantoin in a suitable amount of solution containing a base followed by a mixing of the two solutions. During the reaction, it is desirable that the temperature be kept at a temperature not appreciably above room temperature. The solution containing the reaction product is advantageously allowed to stand, with occasional stirring to permit precipitation of the precipitated reaction product, after which the allantoin-sulfa-compound may be filtered from the solution, washed free from soluble salts and dried at a temperature not exceeding about 60° to 70° C.

The reaction is formed in accordance with the equation, using the hydrochloride of sulfanilamide and the sodium salt of allantoin as typical:

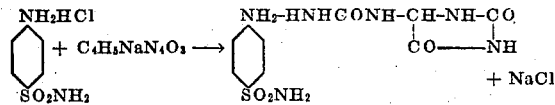

As shown by the above reaction, the sodium allantoinate gives up its sodium and attaches to the sulfanilamide radical, displacing the chlorine which combines with the sodium to produce sodium chloride apart from the sought end product, sulfanilamide-allantoin.

The reaction product obtained is of constant molecular weight for any given sulfa-compound, and is characterized by a definite melting point. It also has a solubility factor greater than either the sulfa-compound or the allantoin. Thus in the case of sulfanilamide-allantoin, the compound has a sharp melting point within 2 degrees plus or minus 210° C. as compared with a melting point of 172° C. for sulfanilamide and 232° C. for allantoin, and has a solubility factor of 0.9% as compared with 0.8% for sulfanilamide and 0.6% for allantoin, or 1.4% in the case of a physical mixture of sulfanilamide and allantoin.

The following are illustrative of the procedure that may be employed to produce the compound of the present invention:

*Example I*

79 grams of allantoin are suspended in 600 c. c. of distilled water. To this suspension 1200 c. c. of a one-half normal solution of sodium hydroxide are added gradually to produce a clear solution of sodium allantoinate. This sodium allantoinate solution is then added slowly to a cold solution of sulfanilamide hydrochloride which has been prepared by dissolving 86 grams of sulfanilamide in a solution of 800 c. c. distilled water and 50 c. c. of concentrated hydrochloric acid. The reaction is kept cold at all times, and the solution should be stirred continuously while the sodium allantoinate is added. The resulting solution is then allowed to stand for a period of about twenty-four hours, during which it is occasionally stirred, after which the precipitated sulfanilamide allantoin crystals may be filtered off by suction. The crystals should then be washed free of chlorides and dried at low temperatures not exceeding about 60°–70° C.

In lieu of the procedure of Example I involving the preparation of solutions of the salts of sulfanilamide and allantoin, the compound may be produced from available salts of these substances, for example, as follows:

*Example II*

Dissolve 90 grams of sodium allantoinate in 1200 c. c. of cold distilled water and 104 grams of sulfanilamide hydrochloride in another 1200 c. c. of cold distilled water. The sodium allantoinate solution is then added to the sulfanilamide hydrochloride solution as described in Example I, supra, after which the procedure followed is the same as set forth in said Example I.

*Example III*

Suspend 79 grams of allantoin in 600 c. c. cold water and to this add 600 c. c. N NaOH, thus producing a clear solution. Add this with stirring to a solution of sulfaguanidine hydrochloride which is made by dissolving 107 grams of sulfaguanidine in 1200 c. c. cold water and 50 c. c. concentrated hydrochloric acid. Let stand twenty-four hours with occasional stirring. Filter crystals off by suction. Wash and dry at low temperature. In place of using allantoin and sulfaguanidine, 90 grams of sodium allantoinate and 125 grams of sulfaguanidine hydrochloride may be employed.

The other allantoin-sulfa-compounds may be prepared by analogous procedures. While the sulfa-compounds and allantoin react in equimolecular proportions as shown by the equation, an excess of one of the compounds may be present with the chemical entity in admixture therewith. Thus a product may be prepared by dissolving in the water in which the reaction is to take place an excess of one of the reactants with the result that a product will be obtained containing the chemical entity and the excess of the reactant. In order to produce an efficacious product in accordance with the present invention, the percentage of the sulfa-compound (including that present in the chemical entity) to the total amount of allantoin and sulfa-compound present in the product will be between about 35% and 65% by weight; and conversely, the percentage of allantoin (including that present in the chemical entity) to the total amount of sulfa-compound and allantoin present will be between about 65% and 35% by weight.

As previously stated, if desired an intimate mixture of the sulfa-compound and the allantoin may be employed. In this case, the two compounds are advantageously mixed in amounts corresponding to equimolecular proportions, but other proportions may be used in particular instances if desired. As in the case of the product containing the chemical entity, the percentage of the sulfa-compound to the total amount of allantoin and sulfa-compound present in the product will be between about 35% and 65% by weight. Any suitable method of mixing may be employed and it is advantageous to have as uniform a mixture of the two compounds as is possible. Hence, the preferable method involves cocrystallization of the compounds from a common solvent, such as water, or a suitable organic solvent. In the preparation of a cocrystallized product of the sulfa-compound and the allantoin, the two compounds may be dissolved in the solvent at an elevated temperature and the solution allowed to cool, or the solvent may be evaporated to permit crystallization.

The following are illustrative of the procedure that may be employed to produce a cocrystallized allantoin-sulfa-compound:

Example IV

To prepare a cocrystallized product containing 65% sulfanilamide and 35% allantoin by weight, 41 grams of allantoin and 73 grams of sulfanilamide are dissolved in 1000 c.c. of distilled water which has been heated to just below the boiling point. The solution is stirred until it has cooled to room temperature and allowed to stand for twenty-four hours to assure complete crystallization. The crystals are removed by filtration aided by suction and washed with cold distilled water and dried at a low temperature. In order to prepare a product containing 35% sulfanilamide and 65% allantoin, the procedure described is followed except that 43 grams of sulfanilamide and 71 grams of allantoin are dissolved in the distilled water. The stated weights of allantoin and sulfa-compound are employed to give the percentages set forth due to the differences in the solubility of the two compounds, the excess of the compound remaining in the mother liquor.

The product whether in the form of a chemical entity or a mixture may be employed in the crystalline form, in solution or it may be embodied in a suitable ointment or salve, depending upon the use or uses to which it is to be put. While the efficiency of the product has been demonstrated primarily as applied externally, the product may be administered internally. In the treatment of an open wound, ulcer, or the like, it has been found desirable merely to place into the wound a suitable quantity of the crystals. On the other hand, in cases where a wet dressing is desired, the product may be used and applied in solution form, for example, .8% to 1% or more in physiological salt solution. Finally, in still other instances such as, for example, burns or, in the case of wounds which do not require hospitalization, the use of the compound in the form of an ointment or salve may be dictated.

In the case of ointments and salves, the product is carried by a suitable base, and, in most cases, the amount of product in the ointment or salve will not exceed about 5% by weight, but in special cases this amount may be increased as desired. Generally, the product will be present in percentages from about 1.5% to 2.5% by weight.

The base employed may be any suitable absorption base capable of absorbing at least 30% of water by weight. Thus a suitable base may be composed of lanolin containing about 3% to 4% cholesterol; anhydrous wool fat (U. S. P.) either alone, or with not more than 70% petrolatum by weight; petrolatum containing from about 3% to 4% cholesterol by weight; or the base may be of the greaseless type comprising stearic acid saponified by sodium borate, triethanolamine, or the like.

In addition, and for the relief of pain, ache and like discomfitures, the ointments or salves may contain small percentages of an anaesthetic compound of the local type, such as, for example, chlorobutanol not in excess of about 5%, benzocaine up to about 10% and preferably about 5%, novocaine about 1%, or any other suitable local anesthetic compound in percentages depending upon the particular compound employed. In addition, other materials commonly used in ointments and salves may be added such as, for example, zinc oxide, ammoniated mercury, etc. To obtain best results from the use of the product in ointment form, the base should be neutral or slightly on the acid side having, for example, a pH from about 6.9 to 7.4.

The following examples are illustrative of suitable ointments or salves containing the product hereinabove described:

Example A

| | Percent |
|---|---|
| Reaction product of sulfanilamide and allantoin | 2.0 |
| Chlorobutanol | 0.5 |
| Distilled water | 25.0 |
| Base—lanolin containing about 3%–4% cholesterol | 72.5 |

Example B

| | Percent |
|---|---|
| Reaction product of sulfanilamide and allantoin | 5.0 |
| Chlorobutanol | 1.0 |
| Distilled water | 25.0 |
| Case—lanolin containing about 3%–4% cholesterol | 69.0 |

Example C

| | Percent |
|---|---|
| Reaction product of sulfanilamide and allantoin | 2.5 |
| Base—saponified stearic acid | 97.5 |

Such an ointment or salve may be produced or prepared by melting down the base and then dissolving therein the chlorobutanol if employed. The sulfanilamide-allantoin reaction product is then dissolved in hot distilled water and the resulting solution is stirred into the base solution. After the compound has been added to the base solution, the resulting solution is stirred until congealed. The percentages of the reaction product and the chlorobutanol may be increased above the percentages given according to the extent of the diseased condition.

As previously stated, use of the product may be employed in crystalline (powdered) form, in solution, or in ointment form.

Considerable modification is possible in the percentage of allantoin and sulfa-compound present in the product within the limits given and in the selection of material to be associated therewith, as well as in the methods of producing the product, without departing from the features of the invention.

The product of the present invention may be used to advantage also in internal medicine for the treatment of infection caused by streptococci, and in such cases at least one advantage results from the fact that the product is absorbed more rapidly into the blood stream than are the sulfa-compounds, when used alone, thereby giving increased activity for a given dose. The product is employed in internal medicine preferably in the form of tablets, capsules, powders, etc., and the quantum of the product taken internally should be under the direction of a physician and in accordance with the age, weight and general condition of the patient as in the case of the internal administration of sulfa-compounds alone.

I claim:

1. A therapeutic product comprising the active molecular structure of allantoin and a sulfa-compound selected from the group consisting of sulfanilamide, sulfapyridine, sulfathiazole, and sulfaguanidine, the percentage of the sulfa-compound to the total amount of sulfa-compound and allantoin present being between 35% and 65% by weight.

2. The therapeutic product of claim 1 wherein the allantoin and sulfa-compound are present in substantially equimolecular proportions.

3. A therapeutic product comprising a co-crystallized mixture of allantoin and a sulfa-compound selected from the group consisting of sulfanilamide, sulfapyridine, sulfathiazole, and sulfaguanidine, the percentage of the sulfa-compound to the total amount of sulfa-compound and allantoin present being between about 35% and 65% by weight.

4. The therapeutic product of claim 3 wherein the sulfa-compound is sulfanilamide, and the allantoin and sulfa-compound are present in substantially equimolecular proportions.

5. A therapeutic ointment comprising an absorption base and a co-crystallized mixture of allantoin and a sulfa-compound selected from the group consisting of sulfanilamide, sulfapyridine, sulfathiazole, and sulfaguanidine, the percentage of the sulfa-compound to the total amount of sulfa-compound and allantoin present being between about 35% and 65% by weight.

6. The method of producing a reaction product of allantoin and a sulfa-compound selected from the group consisting of sulfanilamide, sulfapyridine, sulfathiazole, and sulfaguanidine, which comprises reacting an aqueous solution of an acid salt of said sulfa-compound and a basic salt of allantoin, and separating the reaction product from the solution.

7. The method of producing an intimate mixture of allantoin and a sulfa-compound selected from the group consisting of sulfanilamide, sulfapyridine, sulfathiazole, sulfaguanidine, which comprises dissolving allantoin and the sulfa-compound in a common solvent and co-crystallizing said products therefrom.

8. A product having the formula of

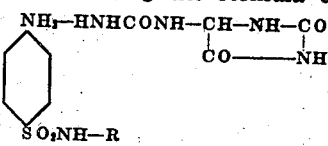

where —R is a substituent selected from the group consisting of —H;

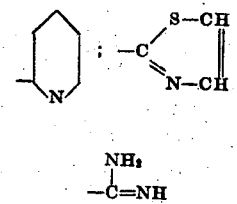

and $$-C=NH$$
$$\phantom{-}|$$
$$\phantom{-}NH_2$$

9. A therapeutic product comprising a reaction product of allantoin and a sulfa-compound, having the formula

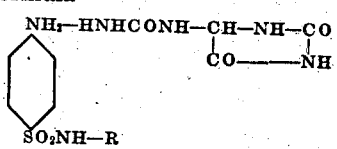

where —R is a substituent selected from the group consisting of —H;

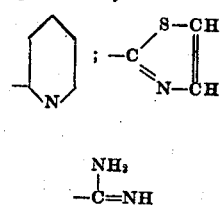

and $$-C=NH$$
$$\phantom{-}|$$
$$\phantom{-}NH_2$$

10. A therapeutic product comprising a reaction product of allantoin and sulfanilamide, having the formula

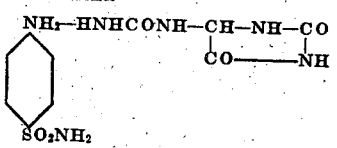

11. A therapeutic ointment comprising an absorption base and a reaction product, having the formula

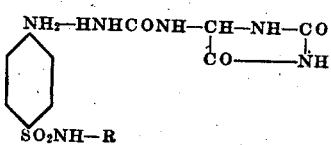

where —R is a substituent selected from the group consisting of —H;

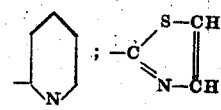

and

SEBASTIAN B. MECCA.